United States Patent [19]

Moro et al.

[11] Patent Number: 5,045,266

[45] Date of Patent: Sep. 3, 1991

[54] PROCESS OF MAKING A HEARING AID EARMOLD IN SITU

[75] Inventors: Daniel G. Moro, Randolph; Samuel H. Ronel, Princeton; Petr Kuzma, Monmouth Junction, all of N.J.

[73] Assignee: National Patent Development Corporation, New York, N.Y.

[21] Appl. No.: 430,839

[22] Filed: Nov. 2, 1989

[51] Int. Cl.$^5$ .............................................. B29C 33/40
[52] U.S. Cl. ................................. 264/222; 181/129; 264/225; 264/331.18; 264/DIG. 30; 424/80; 424/81; 425/2
[58] Field of Search ....... 264/222, 225, 226, DIG. 30, 264/347, 349, 331.18; 425/2; 181/129; 424/61, 78, 80; 525/303

[56] References Cited

U.S. PATENT DOCUMENTS

| | | | |
|---|---|---|---|
| 2,120,006 | 6/1938 | Strain | 264/331.18 |
| 2,972,170 | 2/1961 | Brickhead, Jr. et al. | 264/331.18 |
| 3,579,628 | 5/1971 | Gander et al. | 424/81 |
| 3,827,933 | 8/1974 | Duggins et al. | 264/331.18 |
| 4,272,518 | 6/1981 | Moro et al. | 424/81 |
| 4,857,334 | 8/1989 | Korol et al. | 424/81 |
| 4,575,476 | 3/1986 | Podell et al. | 2/167 |
| 4,871,502 | 10/1989 | LeBisch et al. | 264/222 |

*Primary Examiner*—Jeffery Thurlow
*Assistant Examiner*—Mathieu Vargot
*Attorney, Agent, or Firm*—Irene J. Frangos

[57] ABSTRACT

An acoustically sealed earmold for a hearing aid insertable into the ear of individuals with impaired hearing can be prepared in situ employing the hydrophilic composite polymer materials described herein. Such composite materials include at least one hydrophilic polymer in a powder form and one or more liquid components of which at least one is hydrophilic and which can be polymerized with said hydrophilic polymer. The resulting earmold has a shape-retaining, non-tacky flexible consistency which allows it to be shaped further and also to be modified to accommodate a receiver adapter or external receiver. The earmold can then be cured by any of the conventional curing methods to retain its shape permanently. This method enables an audiologist to fit the earmold and evaluate the hearing aid in a single office visit.

20 Claims, No Drawings

PROCESS OF MAKING A HEARING AIR EARMOLD IN SITU

CROSS-REFERENCE TO RELATED PATENT APPLICATIONS

The present patent application has subject matter related to the disclosure of copending patent application U.S. Ser. No. 07/430,843, filed on Nov. 2, 1989.

BACKGROUND OF THE INVENTION

This invention relates to the fitting and fabrication of hearing aids and more particularly to an earmold suitable for use with hearing aid electronics and to a method of shaping said earmold in situ in a minimum of time and office visits.

A conventional method of fabricating hearing aids with external receivers is to first prepare a standard custom-made earmold from, for example, an acrylic material, which is fit with a snap ring that will accommodate external hearing aid receivers. This procedure involves taking an impression of the external auditory canal of the ear and sending this impression to an earmold company which makes a custom-fit earmold. It is then necessary for the individual to return to the office for fitting and evaluation of hearing aids with the custom-fit earmold. Moreover, since it is impossible to predict whether a particular impression will produce an earmold which is capable of forming an adequate acoustic seal so as to reduce feedback, a number of unsatisfactory molds may be made before an acceptable one is produced.

Another procedure for forming an earmold and evaluate hearing is disclosed in U.S. Pat. No. 4,412,096 which provides a combination earmold and receiver adapter which allows a custom-fit earmold to be made and hearing aids to be evaluated within a single office visit. The combination comprises an earmold made of a flexible, elastic, fast-setting silicon material having a density after curing of about 0.5-3.0 gm/cc.

The structure of the receiver adapter allows it to be physically inserted in the earmold before the silicone material completely cures, and allows receivers to be interchanged and tested, within about fifteen minutes of the beginning of the earmold fabrication procedure.

The silicone materials disclosed therein have a curing time of about 10 to 20 minutes at room temperature thereby providing only a relatively short period of time for the fitting of the earmold in situ. Accordingly, it is disclosed therein that the earmolds produced are not normally utilized as permanent hearing aids.

Having an earmold fitting procedure which allows making a custom-fit permanent earmold within a short time and preferably within one office visit, would greatly facilitate the fitting hearing aids, as well as reduce the amount of time spent with each patient.

SUMMARY OF THE INVENTION

The present invention provides novel hydrophilic polymeric materials which are water-insoluble and water-swellable and which can be shaped effectively both before and after curing. Using such material, a custom fit permanent earmold for a hearing aid can be made in a relatively short time. The material comprises a hydrophilic polymer and a hydrophilic monomer which when mixed together forms a self-setting paste that can be inserted into the external auditory canal by conventional methods. Within minutes the paste sets into a rubbery, strong consistency and can be removed from the ear retaining the shape of the recipient's ear.

After removal of the molded paste from the recipient's ear, it is flexible and soft enough to be trimmed using scissors, scalpel or a razor blade. If needed, holes can be bored easily.

If desired, the cavity needed to accommodate the electronics part of the hearing aid can be formed while the paste is in the ear canal before it sets.

After the foregoing steps the earmold is ready to be cured. Curing can be implemented by conventional curing methods known in the art of polymer chemistry. For the practitioner's office, the oven, heat lamp or a microwave oven can be conveniently utilized. Curing times can be provided so as to be no longer than 30 minutes. The cured earmold is then ready to be coupled with suitable electronic receivers or fittings therefor. If desired, the cured earmold, which is now hard, can be further modified by polishing, drilling, etc. Inasmuch as the material of the earmold is basically acrylic, it can generally be treated similar to other acrylic with regard to adhesives and the like.

However, one major difference from state-of-the-art acrylics is that the material in this invention can be prepared with different degrees of hydrophilicity which means it will behave differently when in use. The surface of the earmolds as provided herein is capable of absorbing moisture, such as perspiration, and the fit will become softer, more snug and less slippery.

Further, when desired, the mold can be cleaned with conventional surfactant cleansers.

In summary, the earmold as described herein has the advantage that it requires little clinical time to obtain an acceptable permanent earmold which can be used immediately with electronic components, e.g., an external receiver and/or receiver adapter.

The above advantages are attained by utilizing a novel settable paste which can be cured when molded to a hard or semi-hard state and which comprises at least one water-insoluble, water-swellable, hydrophilic polymer (e.g., poly[2-hydroxyethyl methacrylate]) which is in a finely divided powder form and which is mixed with at least one hydrophilic solvent/plasticizer which is capable of vinyl polymerization, (e.g., 2-hydroxyethyl methacrylate monomer). When a solvation or plasticization occurs, the components will set, resulting in a rubbery, shape-retaining article which can be further cured into a stable, insoluble, hydrophilic hard or semi-hard earmold.

It is important that the two basic components are hydrophilic, as the hydrophilic interaction is the basis for setting, (such as hydrogen bonding).

In order to impart desired properties, i.e., hardness, softness, different degree of hydrophilicity, color, etc., other components as hereinlater described, can be incorporated therein.

For lesser hydrophilicity the powderized polymer can contain more hydrophobic moiety or the powder can be made from a copolymer of hydrophilic and hydrophobic components. Similarly, the plasticizer can be a monomer of lower hydrophilicity, (e.g., hydroxypropylmethacrylate) or a mixture of hydrophilic with hydrophobic monomers, (e.g., 2-hydroxypropylmethacrylate with a small amount of methylmethacrylate). It is important to note, however, that too much of hydrophobic components will disrupt the hydrophilic interactions needed for the paste to set.

The final properties can be also affected by the use of a coplasticizer which is not polymerizable. Such coplasticizer will affect hardness and setting time. It is preferred, but it is not required, that a small amount of crosslinking agent is added so the final product is three dimensional and its components cannot be separated, i.e., with solvents.

To facilitate the final curing step it may be necessary to add an initiator of polymerization. The choice of an initiator will depend on the curing method.

The final properties can also be modified with the use of fillers and the like and the appearance can be modified with dyes and the like.

Also, as the final product will have a controlled degree of hydrophilicity, i.e., it will behave as a hydrogel. This property can be utilized, if desired, for the controlled release of medicinally active substances, i.e., germicides, fungicides, antibiotics, analgesics, etc.

It is deemed advisable at this time to set forth certain definitions which will facilitate in understanding the invention as described herein.

The term "working time", as used herein, is the maximum period of time during which the novel paste (in the mixing vessel), is in a settable and usable state. After the working time period is exceeded (in the mixing vessel) the paste "hardens" and "sets"; the earmolds resulting therefrom are either non-attainable or very poor in characteristics. One can liken such hardened or set paste with a mixture of plaster of paris and water which has remained in the mixing vessel beyond its settable period.

The term "setting time", as used herein, is the period of time required commencing upon the shaping or molding of the novel paste, to form a non-tacky, in situ shaped or molded earmold.

The term "curing time", as used herein, is the time utilized subsequent to "hardening" or "setting" to cure the "set" earmold product by conventional curing methods, i.e., heat, gamma irradiation, UV light, etc.

The term "composite" as used in conjunction with the "set" or "cured" hydrophilic earmold products herein is used inasmuch as such articles may be made up from distinct, albeit similar, parts, e.g., HEMA powder and HEMA monomer, as well as fillers and other ingredients, and combine the typical or essential characteristics of the parts of said composite.

The term "paste", as used herein, relates to a soft plastic, shapable, moldable mixture comprised of the "composite" parts. It is most preferably homogenous.

DESCRIPTION OF THE PREFERRED EMBODIMENTS

Hydrophilic Polymer Component

The hydrophilic polymeric component useful in the practice of the invention is a hydrophilic, water-insoluble, water-swellable, generally at least slightly crosslinked, and preferably non-toxic, particulate solid. Poly(2-hydroxyethylmethacrylate), i.e., (poly HEMA), is preferred. However, other hydroxyalkylacrylates or hydroxyalkylmethacrylates can be employed. Also, other hydrophilic polymers such as polyacrylamides, polymethacrylamides, substituted polyacrylamides or polymethacrylamides, polyvinylpyrrolidone, polymethacrylic acid, polyacrylic acid, polyglycolacyrlates and methacrylates, etc., can be used.

Typical of the classes of monomers useful in the preparation of the hydrophilic polymer component are the hydroxyalkyl 2-alkenoates such as the hydroxy($C_2$–$C_4$alkyl) methacrylates and the hydroxy($C_2$–$C_4$alkyl) acrylates; the hydroxy($C_2$–$C_4$alkoxy$C_2$–$C_4$alkyl) alkenoates, e.g., 2-hydroxyethoxyethyl acrylate and methacrylate; the alkoxy($C_2$–$C_4$alkoxy$C_2$–$C_4$alkyl) alkenoates, e.g., methoxyethoxyethyl acrylate and methacrylate; the N-vinylpyrrolidones including the mono- and di-($C_1$–$C_4$alkyl)-N-vinylpyrrolidones; the 2-alkenamides including the N-($C_1$–$C_4$alkyl)-2-alkenamides and $N_1N$-di($C_1$–$C_4$alkyl)-2-alkenamides such as the N-($C_1$–$C_4$alkyl) acrylamides, the N-($C_1$–$C_4$alkyl)-methacrylamides, the $N_1N$-di($C_1$–$C_4$alkyl)acrylamides, and $N_1N$-di($C_1$–$C_4$alkyl) methacrylamides; the vicinal-epoxyalkyl 2-alkenoates, including the vicinal-epoxy($C_1$–$C_4$alkyl) methacrylates, and the vicinal-epoxy ($C_1$–$C_4$alkyl) acrylates; with or without other monomers or modifiers such as the alkyl alkanoates, e.g., methyl butyrate, butyl acetate, etc.; the dialkylaminalkyl 2-alkenaotes, e.g., diethylaminoethyl methacrylate; the vinylpyridines; the lower alkoxy (lower alkyl) methacrylates, e.g., ethoxyethyl methacrylate; and mixtures of the illustrative foregoing compounds.

Preferred monomers useful in the preparation of polymers include, by way of examples, 2-hydroxyethyl acrylate; 2-hydroxyethyl methacrylate; diethylene glycol monoacrylate; diethylene glycol monomethacrylate; 2-hydropropyl acrylate; 2-hydroxypropyl methacrylate; 3-hydroxypropyl acrylate; 3-hydroxpropyl methacrylate; dipropylene glycol monomethacrylate; dipropylene glycol monoacrylate; acrylamide; N-methylmethacrylamide; N,N-dimethacrylamide; methylvinylpyrrolidone; glycidyl methacrylate; 2,3-dihydroxypropyl methacrylate; and the like. Most preferred is 2-hydroxyethyl methacrylate, (HEMA monomer).

Particularly suitable hydrophilic polymers are those which are characterized by being made from at least 50 mol percent, preferably at least 80 mol percent, of a monomer of the formula:

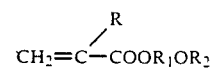

wherein R is hydrogen or methyl; wherein $R_1$ is $C_2$–$C_4$alkylene, e.g., ethylene, propylene or butylene; and wherein $R_2$ is hydrogen or $C_1$–$C_4$alkyl, or $C_1$–$C_4$alkoxy$C_1$–$C_4$alkyl. The resulting hydrophilic polymer will thus be characterized by at least 50 mol percent, preferably at least 80 mol percent, of the following recurring unit:

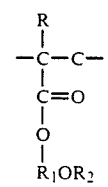

wherein R, $R_1$ and $R_2$ have the aforesaid assigned values.

As an example of a preferred polymer for the present invention is a hydroxyethyl methacrylate polymer prepared by aqueous bulk polymerization using ultra-pure monomers characterized by a very low concentration of impurities conducive to crosslinking reactions, see U.S. Pat. No. 3,963,685. The above polymers can be prepared under "clean conditions" easily purified from residual monomers, and easily reduced to powders of the desired particle size.

The molecular weight of the hydrophilic polymer desirably is of at least about 50,000 and preferably above about 250,000 and upwards to several million. Molecular weights over the entire range and even outside these limits may be tolerated providing the hydrophilic polymers meet the characteristics noted in this specification. Hydrophilic polymer in particulate form is employed in the preparation of the novel pastes. Desirably, the polymer is micropulverized to particles of a dimension smaller than 50 mesh, preferably below 100 mesh (Tyler sieve). In one desirable embodiment, the bulk density of the particulate hydrophilic powder is at least about 0.6 gram/cc, and preferably at least about 0.7 gram/cc. Polymers 2-hydroxyethyl methacrylate in the 100 to 375 mesh range are particularly suitable in the practice of preferred aspects of the invention.

Solvent/Plasticizer—Polymerizable Hydrophilic Monomer Component

The water-insoluble water swellable hydrophilic polymers described in "Hydrophilic Polymer Component" supra are preferably capable of forming with the hydrophilic monomer component as described herein as a novel settable paste.

Typical of the classes of monomers which can be used as the hydrophilic monomer component are the hydroxyalkyl 2-alkenoates such as the hydroxy($C_2$-$C_4$alkyl) methacrylates and the hydroxy($C_2$-$C_4$alkyl) acrylates; the hydroxy($C_2$-$C_4$alkoxy$C_2$-$C_4$alkyl) alkenoates, e.g., 2-hydroxyethoxyethyl acrylate and methacrylate; the alkoxy($C_2$-$C_4$alkoxy$C_2$-$C_4$alkyl) alkenoates, e.g., methoxyethoxyethyl acrylate and methacrylate; the N-vinylpyrrolidones including the mono- and di-($C_1$-$C_4$alkyl)-N-vinylpyrrolidones; the 2-alkenamides including the N-($C_1$-$C_4$alkyl)-2-alkenamides and $N_1$N-di($C_1$-$C_4$alkyl)-2-alkenamides such as the N-($C_1$-$C_4$alkyl) acrylamides, the N-($C_1$-$C_4$alkyl)-methacrylamides, the $N_1$N-di($C_1$-$C_4$alkyl)acrylamides, and $N_1$N-di($C_1$-$C_4$alkyl) methacrylamides; the vicinal-epoxyalkyl 2-alkenoates, including the vicinal-epoxy($C_1$-$C_4$alkyl) methacrylates, and the vicinal-epoxy ($C_1$-$C_4$alkyl) acrylates; with or without other monomers or modifiers such as the alkyl alkanoates, e.g., butyrate, butyl acetate, etc.; the dialkylaminalkyl 2-alkenaotes, e.g., diethylaminoethyl methacrylate; the vinylpyridines; the lower alkoxy (lower alkyl) methacrylates, e.g., ethoxyethyl methacrylate; and mixtures of the illustrative foregoing compounds.

Preferred monomers include, by way of examples, 2-hydroxyethyl acrylate; 2-hydroxyethyl methacrylate; diethylene glycol monoacrylate; diethylene glycol monomethacrylate; 2-hydropropyl acrylate; 2-hydroxypropyl methacrylate; 3-hydroxypropyl acrylate; 3-hydroxpropyl methacrylate; dipropylene glycol monomethacrylate; dipropylene glycol monoacrylate; acrylamide; N-methylmethacrylamide N,N-dimethacrylamide; methylvinylpyrrolidone; glycidyl methacrylate; 2,3-dihydroxypropyl methacrylate; and the like. Most preferred is 2-hydroxyethyl methacrylate; (HEMA monomer).

Coplasticizer—Hydrophilic Solvent Component

A solvent may be employed, if desired, in conjunction with the hydrophilic monomer component when forming the settable paste containing the hydrophilic polymer of the present invention.

The solvents contemplated herein are inert, non-toxic, normally-liquid, water-miscible organic liquids as exemplified by water-miscible polar compounds including the glycols such as ethylene glycol; propylene glycol; dipropylene glycol butanediol-1,3; butanediol-1,4; hexanediol-2,5; 2-methyl-2,4-pentanediol; heptanediol-2,4; 2-ethyl-1,3-hexanediol; diethylene glycol; triethylene glycol; tetraethylene glycols; and the higher polyethylene glycols and other water-soluble oxyalkylene homopolymers and copolymers having a molecular weight up to 2000, and higher, desirably up to 1600, e.g., hydroxy-terminated polymers of ethylene oxide having average molecular weights of 200–1000, the water-soluble oxyethyleneoxypropylene polyol (especially glycol) polymers having molecular weights up to about 1500, desirably up to about 1000, propylene glycol monoethyl ether; monoacetin; glycerine; tri(hydroxyethyl) citrate; ethylene glycol monomethyl ether; ethylene glycol monoethyl ether; di(hydroxypropyl) oxalate; hydroxypropyl acetate; glyceryl triacetate; glyceryl tributyrate; liquid sorbitol ethylene oxide adducts; liquid glycerine ethylene oxide adducts; diethylene glycol monomethyl ether; diethylene glycol monoethyl ether; and ethylene glycol diacetate.

Water, either alone or in combination with the above solvents, is contemplated by the present invention.

The proportion of the hydrophilic polymer component to the monomer component or mixture of monomer component and solvent component will be governed, to a significant extent, by variable such as the hydrophilic polymer of choice, the particle size of the polymer, the molecular weight of the polymer, the hydrophilic monomer of choice, the molecular weight of the monomer, the organic liquid of choice, the molecular weight of the organic liquid, the particar hardening time, setting time, and/or working time which is desired, and other factors. As will be apparent from a consideration of the working Examples, the mixing of the components together to obtain a uniform paste is relatively easy to accomplish. Taking into account the above factors, one skilled in the art can readily determine the optimum amount of particulate hydrophilic polymer relative to monomer or monomer plus solvent which is necessary to yield a paste possessing a setting time of up to about 1 hour, preferably less than one hour, e.g., less than 45–50 minutes, and a working time which is sufficient to allow an operator to obtain by suitable means an integral, homogeneous, non-tacky occlusive shaped article of sufficient mechanical strength and other suitable properties. In the practice of preferred aspects of the invention novel pastes are prepared by using polymer to monomer or monomer plus solvent ratios (by weight) of from about 0.5:1 to about 2.0:1, preferably from about 0.85:1 to below about 1.75:1, more preferably still from about 0.85:1 to about 1.55:1, and most preferably from above about 0.85:1 to below about 1.45:1.

If the mixture of a hydrophilic polymer with a hydrophilic monomer results in a composite polymer product which is too hydrophilic, it may be necessary to employ a sufficient amount, generally up to 50 mol percent, of a copoymerization monomer which will render the composite polymer earmold less hydrophilic. Such comonomers include, by way of illustrations, methyl acrylate; ethyl acrylate; propyl acrylate; butyl acrylate; 2-ethylhexyl acrylate; ethyl methacrylate; butyl methacrylate;

methoxyethyl acrylate; methoxyethyl methacrylate; and ethoxyethyl methacrylate.

Crosslinking Agent

Desirably, small amounts of cross-linking agent or other ingredient either inherently contained in the monomer and/or added thereto, or other means, e.g., photopolymerization, can be employed to impart a three-dimensional, water-insoluble, structure to the resulting hydrophilic composite product.

The amount of crosslinking agent employed herein is usually kept low, i.e., amounts of from about 0.05 to about 10 weight percent. Such amounts will be governed by the effectiveness or activity of such agent.

Illustrative crosslinking agents include ethylene glycol diacrylate; ethylene glycol dimethacrylate; 1.2,-butylene dimethacrylate; 1,3-butylene dimethacrylate; 1,4-butylene dimethacrylate; propylene glycol diacrylate; propylene glycol dimethacrylate; diethylene glycol dimethacrylate; dipropylene glycol dimethacrylate; divinylbenzene; divinyltoluene; divinyl tartrate; triallyl melamine; glycerine trimethacrylate; diallyl maleate; diallyl monoethylene glycol citrate; allyl vinyl maleate; diallyl itaconate; ethylene glycol diester of itaconic acid; divinylsulfone; triallyl phosphite, polyester of maleic anhydride with triethyleneglycol; polyallyl glucose; pentaallyl sucrose; sucrose diacrylate; glucose dimethacrylate; divinyl citraconate; dially fumarate; glycidyl methacrylate; allyl methacrylate; and vinyl methacrylate. The crosslinking agent(s) usually, but not necessarily, have at least two ethylenically unsaturated double bonds. The most suitable crosslinking agents are dimethacrylates and/or diacrylates of the ethylene glycol homologues, including mono- di-, tri-, tetra-, poly-, etc. ethylene glycol. Various other bi- and poly-functional ethylenically unsaturated monomers are also appropriate as indicated above.

Polymerization (Curing) and Initiators of Polymerization

The novel composite articles of the present invention can be cured by well known polymerization techniques using convention free radical initiators. The polymerization reaction can be carried out at over a wide temperature range, e.g., 20° to 105° C., frequently 35° to 40° C. to 90° C. A catalytically significant quantity of a free-radical catalyst is employed, e.g., from 0.05 to 1 percent based on the total weight of polymerizable monomers. Typical catalysts include t-butyl peroctoate, isopropyl percarbonate, and benzoyl peroxide. Irradiation, e.g., by ultraviolet light or gamma rays, can also be employed to catalyze the polymerization reaction.

The type and amount of the free-radical initiator used to effect the polymerization is not critical and will be obvious to those versed in the art. The only limitations imposed on the choice of the initiator is its solubility in the final (i.e., monomer(s), solvent(s) and active ingredients) mixture and its ability to initiate the polymerization at temperatures acceptable for the given ingredient.

Fillers

Fillers can be, for example, silica, e.g., Aerosil 380, diatomaceous earth, Fullers earth, clays, talc, mica, bentonite, wood flour, and the like. Fibers natural or man-made are suitable fillers as well.

Also contemplatd herein are materials prepared from the hydroxy lower alkyl celluloses, cross-linked or otherwise, and rendered insoluble in water but still retaining their hydrophilicity and solubility in organic solvents such as methanol, e.g., from hydroxyethylcellulose, hydroxypropylcellulose or carboxymethylcellulose; the partially cross-linked natural polymers such as guar gum, karaya gum, gelatin, e.g., partially cross-linked with formaldehyde or glutaraldehyde and salts of alginic acid which are rendered water insoluble.

Release of Active Ingredients or Fragrances

The hydrophilic composite earmold of the present invention lend themselves to the release of medicinally active ingredients contained therein.

Medicinally active ingredients such as germicides, fungicides, antibiotics, analgesics, or the like may be utilized by having the medicinally active ingredient suspended, entrapped in, or admixed with the polymer or in the novel paste. Examples of such medicinally active ingredients include silver sulfadiazine; benzocaine; xylocaine; aspirin; sodium omadine (a derivative of 1-hydroxypyridine-2-thione); hexachlorophene; bacitracin; cortisone; trimethylbenzylammonium chloride; cetyl pyridinium chloride; penicillin; Aueromycin (chlorotetracycline); chloromycetin (chloromphenicol).

If desired, the active ingredient may also be a fragrance.

There can be added soluble or insoluble dyes and pigments and the like so as to impart flesh tones to the earmold product.

Unless otherwise indicated, all parts and/or percentages throughout this application are by weight.

The terms "polymer" and "copolymer" are used interchangeably herein and designate polymeric products obtained by the polymerization of two or more polymerizable monomers and/or polymerizable polymers and/or mixtures thereof.

In the following Examples which illustrate the preferred embodiments of the present invention, pastes are prepared by mixing the components utilized homogeneously. The hydrophilic polymer to plasticizer ratios utilized are as hereinbefore set forth. Other ingredients, i.e., coplasticizers, initiators, fillers, etc. are added in amounts suitable to illustrate the specific needs. These ingredients are added in amounts which would not interfere with the subsequent curing step.

The homogeneous paste resulting from the mixing step is formed into a desired shape by molding, preferably directly in the recipient's ear and allowed to set. When fully set, the earmold retains its shape and has rubbery characteristics. In this state it can be shaped further (if needed) by cutting, shaving, polishing, etc. and can be drilled or otherwise treated to accommodate hearing aid electronics, fittings, adapters, and the like.

In the next step, it is cured to render it a permanent shape as described previously. The cured earmold can be finished or refined even further by polishing, etc.

EXAMPLE 1

The following material was mixed homogeneously together in a suitable vessel to form a paste:

| | | |
|---|---|---|
| 1st part | 5.0 g | polyHEMA powder |
| 2nd part | 4.0 g | HEMA monomer |
| | 0.04 g | ethyleneglycoldimethacrylate |
| | 0.02 g | percadox-16 (Noury Initiator) |

After mixing for about 2-3 minutes, the paste was transferred into an applicator and injected into an external ear canal (a rubber earmold was used). A small round cylinder was pressed into the paste before it had a chance to set. The cylinder forms a cavity in the earmold to provide a space suitable to accommodate the electronics. It is obvious that a cavity of substantially any configuration can be made this way. Upon setting (approximately 10 minutes), the earmold was removed from the ear canal and trimmed with a sharp instrument. The earmold was then transferred into an oven and cured at 90° C. for 30 minutes. The cured earmold was hard and could be polished, or otherwise refined, if desired.

EXAMPLE 2

The earmold in this Example was made less hydrophilic by replacing HEMA (2-hydroxyethylmethacrylate) with hydroxypropymethacrylate:

| | | |
|---|---|---|
| 1st part | 5.0 g | polyHEMA powder |
| 2nd part | 4.0 g | hydroxypropylmethacrylate |
| | 0.04 g | ethyleneglycoldimethacrylate |
| | 0.02 g | percadox-16 (Noury Initiator) |

After homogeneous mixing, a paste was obtained which was treated identically as in Example 1.

EXAMPLE 3

In this Example, the hydrophilicity of the earmold was reduced more than in the previous Examples by introducing an additive (silica gel, Ace Scientific Supply Co.):

| | | |
|---|---|---|
| 1st part | 5.0 g | polyHEMA powder |
| | 1.0 g | silica gel, grade 113, Mesh 25 |
| 2nd part | 4.0 g | hydroxypropylmethacrylate |
| | 0.04 g | ethyleneglycoldimethacrylate |
| | 0.02 g | percadox-16 (Noury Initiator) |

Both parts of the composition were mixed homogeneously and the resulting paste was treated identically as in Example 1.

It is notable from these typical Examples that the final properties of the earmold material can be customized, as desired. As disclosed herein, other additives, such as medicinally active ingredients, dyes, fragrances, fillers, etc. can also be employed.

What is claimed is:

1. A process for producing an earmold suitable for use in a hearing aid which comprises (1) forming a settable paste by homogeneously mixing (a) a particulate water-insoluble, water-swellable, hydrophilic polymer with (b) a hydrophilic monomeric plasticizer which is capable of vinyl polymerization with said polymer, said polymer selected from the group consisting of a hydroxyalkyl 2-alkenoate; a hydroxy ($C_2$-$C_4$ alkoxy$C_2$-$C_4$ alkyl) alkenoate; an alkoxy ($C_2$-$C_4$ alkoxy$C_2$-$C_4$ alkyl) alkenoate; a N-vinylpyrrolidone; a 2-alkenamide; a N-($C_1$-$C_4$ alkyl)-methacrylamide; a N-($C_1$-$C_4$ alkyl)-methacrylamide; a $N_1$N-di($C_1$-$C_4$ alkyl) acrylamide; a $N_1$-N-di($C_1$-$C_4$ alkyl) methacrylamide; a vicinal-epoxyalkyl 2-alkenoate; a vicinal-epoxy ($C_1$-$C_4$ alkyl) acrylate and mixtures thereof and said monomer selected from the group consisting of a hydroxyalkyl 2-alkenoate; a hydroxy ($C_2$-$C_4$ alkoxy$C_2$-$C_4$ alkyl) alkenoate; an alkoxy ($C_2$-$C_4$ alkoxy$C_2$-$C_4$ alkyl) alkenoate; a N-vinylpyrrolidone; a 2-alkenamide; a N-($C_1$-$C_4$ alkyl)-methacrylamide; a N-($C_1$-$C_4$ alkyl)-methacrylamide; a $N_1$N-di($C_1$-$C_4$ alkyl) acrylamide; a $N_1$-N-di($C_1$-$C_4$ alkyl) methacrylamide; a vicinal-epoxyalkyl 2-alkenoate; a vicinal-epoxy ($C_1$-$C_4$ alkyl) acrylate and mixtures thereof, and wherein said monomer is present in an amount sufficient to impart to said paste a setting time period no greater than about one hour and a working time sufficient to shape said paste; (2) shaping said paste into the form of an earmold; (3) allowing said paste to set; (4) modifying the shape of said paste while in such set condition; and (5) subsequent curing said shaped paste in such set condition.

2. The process of claim 1 wherein the earmold is shaped in situ in a recipient's ear.

3. The process of claim 1 wherein said polymer is at least slightly crosslinked and has a molecular weight at least about 50,000.

4. The process of claim 1 wherein said polymer is selected from the group consisting of 2-hydroxyethyl acrylate; 2-hydroxyethyl methacrylate; diethylene glycol monoacrylate; diethylene glycol monomethacrylate; 2-hydropropyl acrylate; 2-hydroxypropyl methacrylate; 3-hydroxypropyl acrylate; 3-hydroxyproyl methacrylate; dipropylene glycol monomethacrylate; dipropylene glycol monoacrylate; acrylamide; N-methylmethacrylamide; N,N-dimethacrylamide; methylvinylpyrrolidone; glycidyl methacrylate; 2,3-dihydroxypropyl methacrylate; and mixtures thereof.

5. The process of claim 1 wherein said polymer is characterized by at least 50 mol percent of the following recurring unit

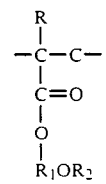

wherein R is hydrogen or methyl, wherein $R_1$ is $C_2$-$C_4$ alkylene, and wherein $R_2$ is hydrogen, $C_1$-$C_4$ alkyl or $C_1$-$C_4$ alkoxy $C_1$-$C_4$ alkyl.

6. The process of claim 5 wherein said polymer is characterized by at least 80 mol percent and wherein R is methyl and wherein $R_1$ is methyl and wherein $R_1$ is $C_2$-$C_4$ alkylene.

7. The process of claim 6 wherein said polymer is selected from the group consisting of poly(2-hydroxyethylmethacrylate).

8. The process of claim 1 wherein said monomer is selected from the group consisting of 2-hydroxyethyl acrylate; 2-hydroxyethyl methacrylate; diethylene glycol monoacrylate; diethylene glycol monomethacrylate; 2-hydroxypropyl acrylate; 2-hydroxypropyl methacrylate; 3-hydroxypropyl acrylate; 3-hydroxypropyl methacrylate; dipropylene glycol monomethacrylate; dipropylene glycol monoacrylate; acrylamide; N-methylmethacrylamide; N,N-dimethacrylamide; methylvinylpyrrolidone; glycidyl methacrylate; 2,3-dihydroxypropyl methacrylate; and mixtures thereof.

9. The process of claim 8 wherein said monomer is 2-hydroxyethyl methacrylate.

10. The process of of claim 1 wherein a hydrophilic solvent is employed with said monomers, said solvent being an inert, normally-liquid, water-miscible organic liquid or water.

11. The process of claim 10 wherein said hydrophilic solvent is selected from the group consisting of ethylene glycol; propylene glycol; dipropylene glycol; butanediol-1,3, butanediol-1,4; hexanediol-2,5; 2-methyl-2,4-pentanediol; heptanediol-2,4; 2-ethyl-1,3-hexanediol; diethylene glycol; triethylene glycol; tetraethylene glycol; a higher polyethylene glycol or other water-soluble oxyalkylene homopolymer or copolymer having a molecular weight up to about 2000; a water-soluble oxyethyleneoxypropylene polyol polymer having a molecular weight up to about 1500; propylene glycol monoethyl ether; monoacetin; glycerine; tri(hydroxyethyl) citrate; ethylene glycol; monomethyl ether; ethylene glycol monoethyl ether; di(hydroxypropyl) oxalate; hydroxypropyl acetate; glyceryl triacetate; glyceryl tributyrate; a liquid sorbitol ethylene oxide adduct; a liquid glycerine ethylene oxide adduct; diethylene glycol monomethyl ether; diethylene glycol monoethyl ether; ethylene glycol diacetate and water.

12. The process of claim 1 wherein a crosslinking agent is employed in an amount of from about 0.05 to 10 weight percent based on the total weight of the polymer and monomer in said paste.

13. The process of claim 1 wherein said paste contains a free-radical initiator therein.

14. The process of claim 1 wherein said paste contains a filler.

15. The process of claim 1 wherein said paste contains a medicinally active ingredient therein.

16. The process of claim 1 wherein said paste contains an active ingredient which is a fragrance.

17. The process of claim 1 wherein said paste contains a dye or pigment.

18. The process of claim 1 wherein said paste is cured at a temperature of from about 20° to about 105° C.

19. The process of claim 1 wherein said shaped paste is modified before setting so as to accommodate hearing aid electronics or adapters.

20. The process of claim 1 wherein said shaped paste is modified after setting so as to accommodate hearing aid electronics or adapters.

* * * * *